United States Patent
Ohta et al.

(10) Patent No.: US 9,900,465 B2
(45) Date of Patent: Feb. 20, 2018

(54) ADJUSTING IMAGE DATA USING DIVIDED AREAS

(71) Applicants: Naoki Ohta, Kanagawa (JP); Tomonori Tanaka, Kanagawa (JP); Mitsutaka Iwasaki, Kanagawa (JP); Yuuto Watanabe, Kanagawa (JP)

(72) Inventors: Naoki Ohta, Kanagawa (JP); Tomonori Tanaka, Kanagawa (JP); Mitsutaka Iwasaki, Kanagawa (JP); Yuuto Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/371,630

(22) Filed: Dec. 7, 2016

(65) Prior Publication Data
US 2017/0187916 A1     Jun. 29, 2017

(30) Foreign Application Priority Data

Dec. 25, 2015  (JP) .................................. 2015-254938

(51) Int. Cl.
*H04N 1/387* (2006.01)
*H04N 1/21* (2006.01)

(52) U.S. Cl.
CPC ......... *H04N 1/3878* (2013.01); *H04N 1/2104* (2013.01); *H04N 2201/0094* (2013.01)

(58) Field of Classification Search
None
See application file for complete search history.

(56) References Cited

U.S. PATENT DOCUMENTS

| 4,920,502 A | * | 4/1990 | Yamada | H04N 1/3875 358/1.12 |
| 5,526,474 A | * | 6/1996 | Fukushima | G06T 11/203 345/443 |
| 5,613,016 A | * | 3/1997 | Saitoh | G06K 9/00463 382/174 |
| 7,991,197 B2 | * | 8/2011 | Natori | G07D 7/12 358/1.5 |

(Continued)

FOREIGN PATENT DOCUMENTS

| JP | 2000-069257 | 3/2000 |
| JP | 2000-296640 | 10/2000 |

*Primary Examiner* — Ming Hon
(74) *Attorney, Agent, or Firm* — Harness, Dickey & Pierce, P.L.C.

(57) ABSTRACT

An image processing device includes a writing circuit to write image data to an image memory and detect a write line number, a coordinate generating circuit to generate coordinate information based on inclination information, detect a minimum sub-scanning coordinate in each of divided areas of the image data, and generate first read addresses for reading the divided areas from the image memory, a reading circuit to read the divided areas from the image memory and detect a read line number, a reading control circuit to bring the reading circuit into a standby state and cancel the standby state, and a memory control circuit to generate write addresses for writing the divided areas to a memory, sequentially write the read divided areas to the memory, generate second read addresses for reading the divided areas from the memory, and sequentially read the divided areas from the memory.

13 Claims, 11 Drawing Sheets

(56) References Cited

U.S. PATENT DOCUMENTS

| | | | |
|---|---|---|---|
| 2004/0150856 A1* | 8/2004 | Asai | G03G 15/36 358/1.18 |
| 2010/0141991 A1* | 6/2010 | Yoshida | H04N 1/3878 358/1.15 |
| 2010/0253981 A1* | 10/2010 | Higashiyama | H04N 1/3878 358/3.26 |
| 2011/0038005 A1* | 2/2011 | Ochiai | G03G 15/5075 358/1.15 |
| 2011/0142352 A1* | 6/2011 | Lee | G06K 9/3275 382/199 |
| 2017/0142286 A1* | 5/2017 | Hirota | H04N 1/3873 |

* cited by examiner

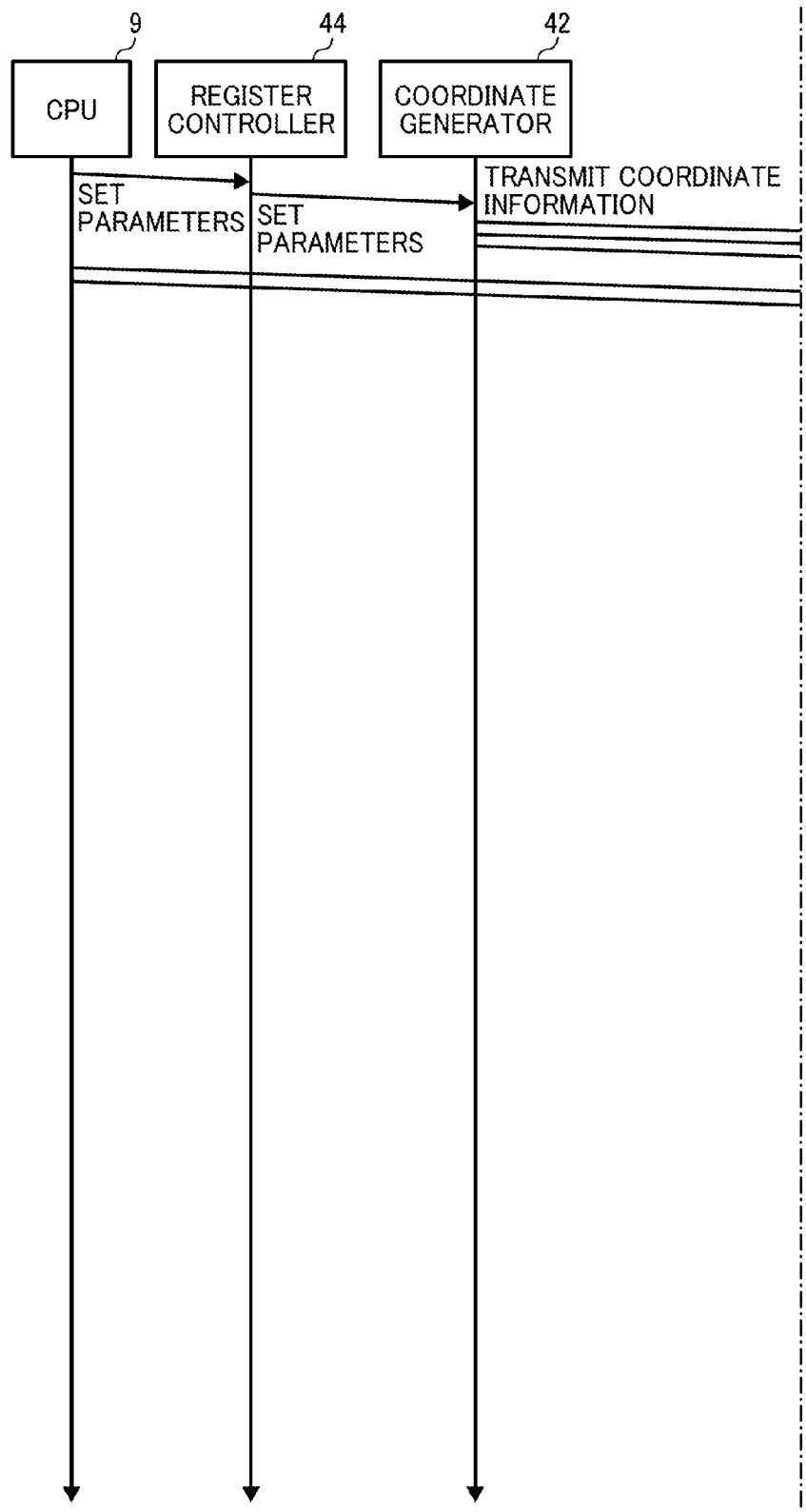

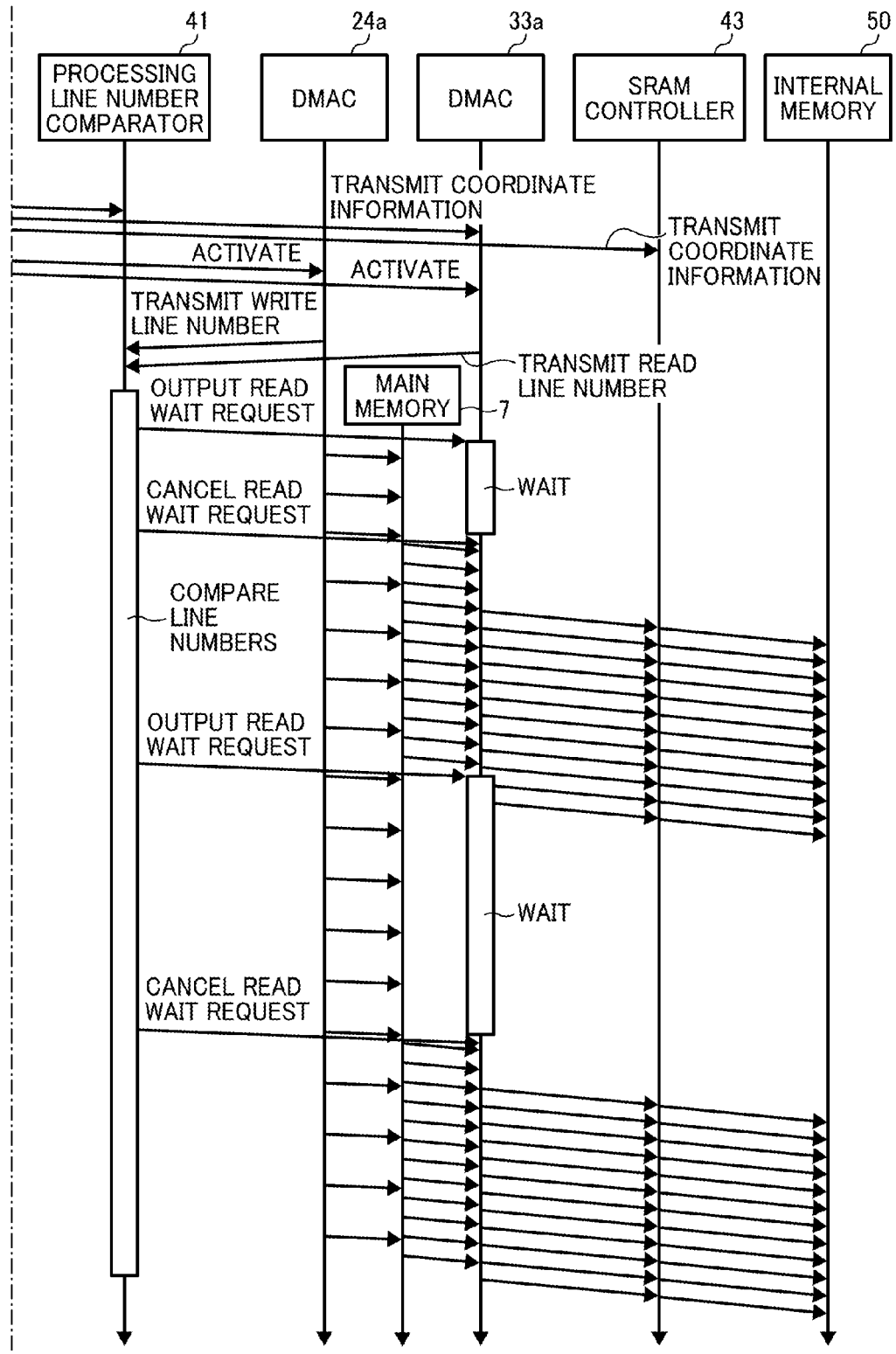

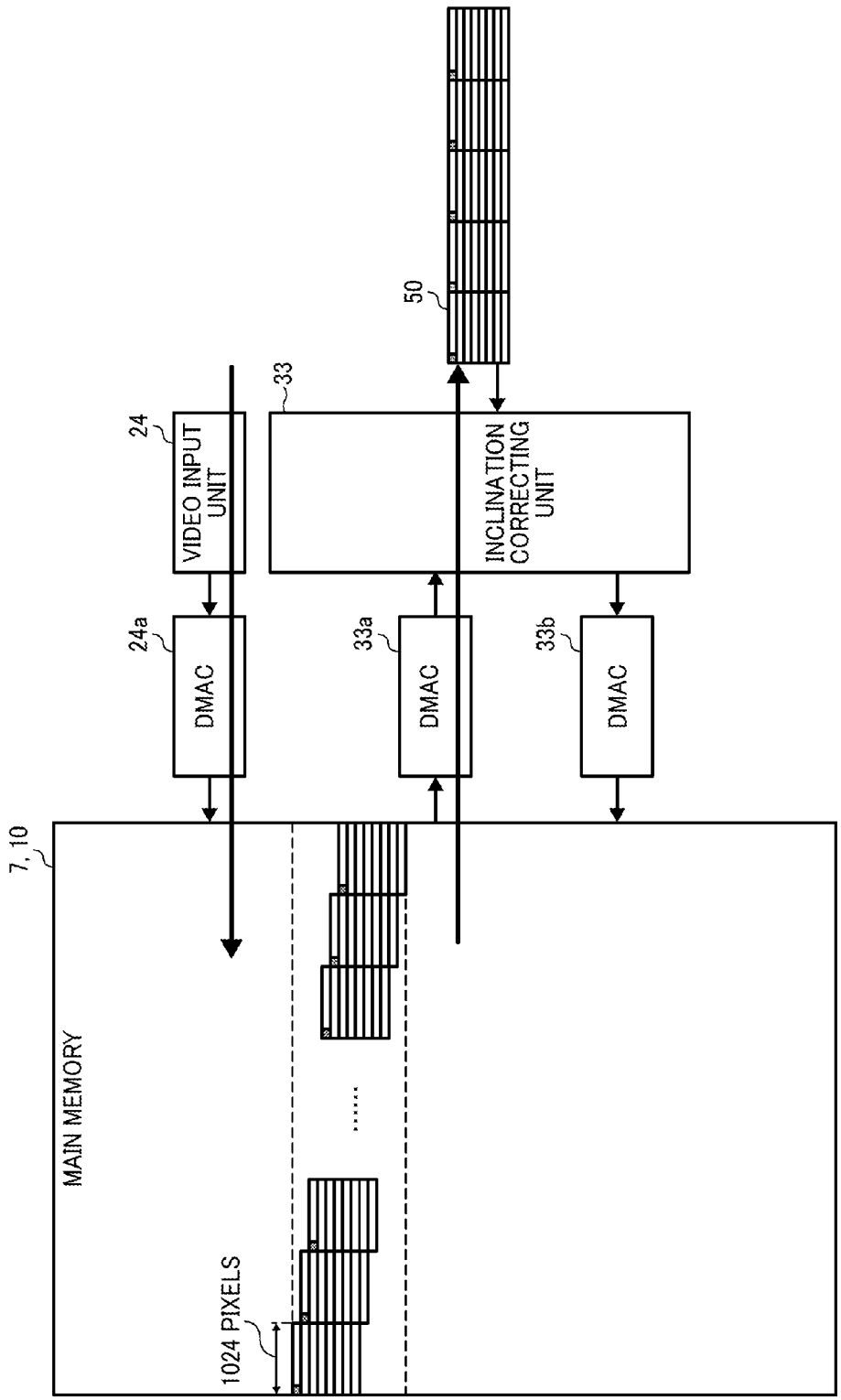

ADJUSTING IMAGE DATA USING DIVIDED AREAS

CROSS-REFERENCE TO RELATED APPLICATION

This patent application is based on and claims priority pursuant to 35 U.S.C. § 119(a) to Japanese Patent Application No. 2015-254938 filed on Dec. 25, 2015, in the Japan Patent Office, the entire disclosure of which is hereby incorporated by reference herein.

BACKGROUND

Technical Field

This invention relates to an image processing device, an image forming apparatus, an image processing method, and a non-transitory recording medium.

Description of the Related Art

An image forming apparatus, such as a multifunction peripheral or a printer, temporarily writes input image data items to an image memory and sequentially reads the image data items therefrom to print out the image data items onto an output medium (hereinafter simply referred to as the sheet) with a printing device of the image forming apparatus.

The image forming apparatus typically performs image data reading from the image memory in parallel with image data writing to the image memory, to thereby reduce the capacity of the image memory.

In this case, the image forming apparatus typically performs an image data transfer control process of controlling the image data writing to and the image data reading from the image memory by comparing the number of lines of image data written to the image memory with the number of lines of image data read from the image memory.

In such a typical image data transfer control process based on the comparison of the number of image data lines, the image data is divided into bands in a sub-scanning direction in desired processing line units, and reading and writing control is performed with an image memory having a capacity of storing the bands. The reading and writing control is repeated by the number of the bands, to thereby transfer the image data with the small-capacity image memory.

If the input image data is inclined or bent, or if an inclination or bend is found not in the input image but in the sheet onto which the image data is to be printed out with the printing device, the image forming apparatus typically executes at least one of the correction of the inclination of the input image data and the adjustment of the image data according to the inclination of the sheet.

SUMMARY

In one embodiment of this invention, there is provided an improved image processing device that includes, for example, a data writing circuit, a coordinate generating circuit, a data reading circuit, a reading control circuit, and a memory control circuit. The data writing circuit writes image data to an image memory, and detects a write line number representing a number of lines of the image data written to the image memory. The coordinate generating circuit generates coordinate information based on inclination information. The coordinate information includes a coordinate in a main scanning direction and a coordinate in a sub-scanning direction that represent a position of each of pixels of the image data relative to an output medium onto which the image data is to be output. The inclination information represents an inclination of the image data in the image memory relative to the output medium. The coordinate generating circuit further detect, from the coordinate information, a minimum sub-scanning coordinate in each of a plurality of divided areas of the image data divided by a predetermined division number in the main scanning direction. The minimum sub-scanning coordinate has a minimum value in the each of the plurality of divided areas of the image data in the sub-scanning direction of the image data. The coordinate generating circuit further generates first read addresses for reading the plurality of divided areas of the image data from the image memory based on the detected minimum sub-scanning coordinate in the each of the plurality of divided areas of the image data. The data reading circuit reads the plurality of divided areas of the image data from the image memory based on the first read addresses, and detects a read line number representing a number of lines of the image data read from the image memory. The reading control circuit brings the data reading circuit into a standby state, in which the data reading circuit stops reading the plurality of divided areas of the image data from the image memory, and cancels the standby state based on the write line number, the read line number, and the coordinate information. The memory control circuit generates write addresses for writing the plurality of divided areas of the image data to a memory based on the coordinate information, sequentially writes the plurality of divided areas of the image data read by the data reading circuit to the memory based on the write addresses, generates second read addresses for reading the plurality of divided areas of the image data from the memory based on the coordinate information, and sequentially reads the plurality of divided areas of the image data from the memory based on the second read addresses.

In one embodiment of this invention, there is provided an improved image forming apparatus that includes, for example, an image reading device, the above-described image processing device, and an image output device. The image reading device reads a document to generate image data of the document. The image processing device performs image processing on the image data. The image output device forms and outputs an image on an output medium based on the image data subjected to the image processing.

In one embodiment of this invention, there is provided an improved image processing method that includes, for example: writing image data to an image memory; detecting a write line number representing a number of lines of the image data written to the image memory; generating coordinate information based on inclination information, the coordinate information including a coordinate in a main scanning direction and a coordinate in a sub-scanning direction that represent a position of each of pixels of the image data relative to an output medium onto which the image data is to be output, and the inclination information representing an inclination of the image data in the image memory relative to the output medium; detecting, from the coordinate information, a minimum sub-scanning coordinate in each of a plurality of divided areas of the image data divided by a predetermined division number in the main scanning direction, the minimum sub-scanning coordinate having a minimum value in the each of the plurality of divided areas of the image data in the sub-scanning direction of the image data; generating first read addresses for reading the plurality of divided areas of the image data from the image memory based on the detected minimum sub-scanning coordinate in the each of the plurality of divided areas of the image data;

reading the plurality of divided areas of the image data from the image memory based on the first read addresses; detecting a read line number representing a number of lines of the image data read from the image memory; stopping and starting the reading the plurality of divided areas of the image data based on the write line number, the read line number, and the coordinate information; generating write addresses for writing the plurality of divided areas of the image data to a memory based on the coordinate information; sequentially writing to the memory the plurality of divided areas of the image data read in the reading the plurality of divided areas of the image data based on the write addresses; generating second read addresses for reading the plurality of divided areas of the image data from the memory based on the coordinate information; and sequentially reading the plurality of divided areas of the image data from the memory based on the second read addresses.

In one embodiment of this invention, there is provided a non-transitory recording medium storing a program for causing a computer to execute the above-described image processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A and 6B are diagrams illustrating a sequence of the inclination correction process;

FIG. 7 is a diagram illustrating an operation of writing image data to a first or second main memory of the multifunction peripheral and an operation of reading image data from the first or second main memory;

DETAILED DESCRIPTION

Figure 1:
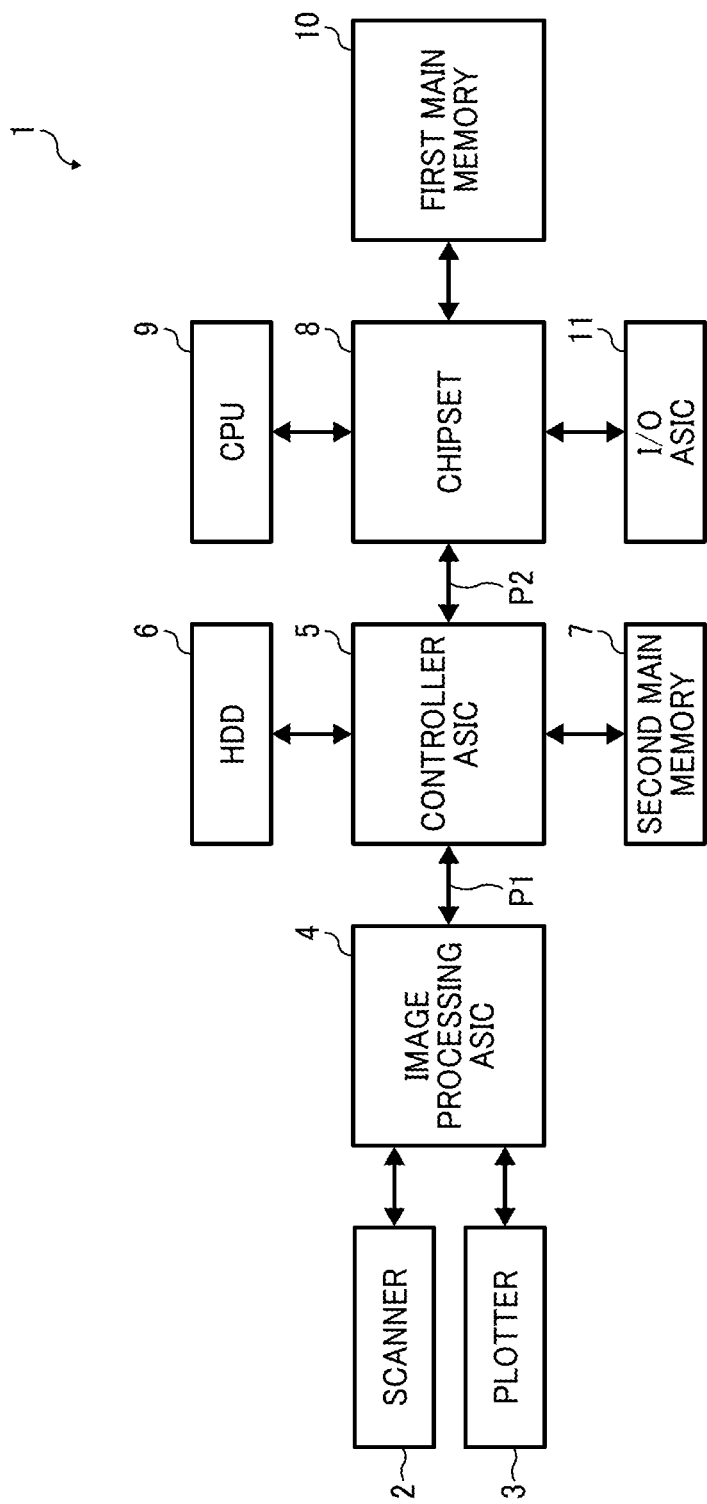
FIG. 1 is a block diagram illustrating a configuration of a multifunction peripheral according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A typical image forming apparatus divides image data into bands in a sub-scanning direction in desired processing line units, and controls image data writing to and image data reading from an image memory having a capacity of storing the bands. When reading inclined image data from the image memory and correcting the inclination of the image data in the reading process, the image forming apparatus obliquely reads the image data, and thus is unable to accurately compare the number of lines of image data written to the image memory and the number of lines of image data read from the image memory. Consequently, inconsistency occurs between the image data writing to the image memory and the image data reading from the image memory, which may prevent the image forming apparatus from performing appropriate memory control.

Referring now to the accompanying drawings, wherein like reference numerals designate identical or corresponding parts throughout the several views, embodiments of the present invention will be described in detail. The following embodiments of the present invention may include various technically favorable limitations. The following description, however, should not unduly limit the scope of the present invention. Further, not all configurations described in the embodiments are required components of the present invention.

FIG. 1 to FIG. 11 are drawings for describing an image processing device, an image forming apparatus, an image processing method, and a non-transitory recording medium according to an embodiment of the present invention. FIG. 1 is a block diagram illustrating a configuration of a multifunction peripheral 1 as an image forming apparatus according to the present embodiment.

In FIG. 1, the multifunction peripheral 1 includes a scanner 2, a plotter 3, an image processing application specific integrated circuit (ASIC) 4, a controller ASIC 5, a hard disk drive (HDD) 6, a second main memory 7, a chipset 8, a central processing unit (CPU) 9, a first main memory 10, and an input/output (I/O) ASIC 11. With these units, the multifunction peripheral 1 executes processes in a plurality of application modes, such as a scan mode, a copy mode, a print mode, and a data transfer mode. The multifunction peripheral 1 executes image processing of correcting an inclination of image data while reducing the capacity of the first main memory 10 used in the image processing, and at the same time, appropriately controlling the number of lines of the image data written to the first main memory 10 and the number of lines of the image data read from the first main memory 10. The first main memory 10 serves as an image memory. As well as the first main memory 10, the second main memory 7 may be used as the image memory.

The scanner 2, which serves as an image reading device, employs a charge coupled device (CCD), a contact image sensor (CIS), or a complementary metal oxide semiconductor (CMOS), for example. The scanner 2 scans a surface of a document in a main scanning direction and a sub-scanning direction to read the image of the surface of the document and generate analog image data of the image. The scanner 2 then converts the analog image data into digital image data with an analog/digital (A/D) converter, and outputs the digital image data of the surface of the document to the image processing ASIC 4. That is, the scanner 2 reads the image of the document, and outputs to the image processing ASIC 4 image data to be printed out with the plotter 3 or image data to be output to an external interface. The scanner 2 is disposed with a document skew sensor that detects an inclination of the document conveyed to a reading position of the scanner 2 and outputs the detected inclination to the CPU 9.

The plotter 3, which serves as an image output device, prints out a color image on a sheet (i.e., an output medium) in accordance with a predetermined image forming method, such as an electrophotographic image forming method, for example. For instance, if the plotter 3 employs an electrophotographic printing device, printing units for respective colors (e.g., cyan (C), magenta (M), yellow (Y), and black (K) colors) are disposed in a line on a sheet conveyance path. In such an electrophotographic plotter 3, each of the printing units for the respective colors includes components such as an optical writing unit, a developing unit, a transfer unit, a charging unit, and a cleaning unit disposed to surround a photoconductor that is driven to rotate. In each of the printing units, the charging unit uniformly charges a surface of the photoconductor, and the optical writing unit irradiates the uniformly charged surface of the photoconductor with writing light modulated based on the image data from the image processing ASIC 4, to thereby form an electrostatic latent image on the surface of the photoconductor. Then, the developing unit supplies toner (i.e., developer) of the color corresponding to the printing unit to the surface of the photoconductor formed with the electrostatic latent image, to thereby develop the electrostatic latent image into a toner image of the corresponding color. The printing units for the respective colors sequentially superimpose and transfer the toner images of the respective colors formed on the respective photoconductors onto the sheet conveyed by a sheet conveyance unit from a sheet feeding cassette to between the photoconductors and transfer units, to thereby form a color toner image on the sheet. The sheet having the color toner image transferred thereto is then conveyed to a fixing unit to have the color toner image fixed on the sheet.

The image processing ASIC 4 performs appropriate correction on the image data of the document read by the scanner 2 to thereby generate corrected image data. The image processing ASIC 4 also generates image separation data describing attributes of the document, such as text or photo and chromatic or achromatic, for example. The image processing ASIC 4 then outputs the corrected image data and the image separation data to the controller ASIC 5. The image processing ASIC 4 further performs image processing on image data transmitted from the controller ASIC 5 to generate image data printable with the plotter 3, and transmits the generated image data to the plotter 3 in appropriate timing with the printing operation of the plotter 3.

The controller ASIC 5 is connected to the image processing ASIC 4, the HDD 6, the second main memory 7, and the chipset 8. The controller ASIC 5 uses the second main memory 7 to perform processes such as rotation and editing of image data used in the multifunction peripheral 1 with the first main memory 10 via the chipset 8. The controller ASIC 5 further stores the image data transmitted from the image processing ASIC 4 into the HDD 6, and transmits the image data stored in the HDD 6 to the image processing ASIC 4.

The HDD 6 is used by the controller ASIC 5 to temporarily store transmitted image data, received image data, and image-processed image data.

The second main memory 7 is used as the image memory in the image processing by the controller ASIC 5, as described above.

The chipset 8 is used with the CPU 9 to control access of the CPU 10, the controller ASIC 5, and the I/O ASIC 11 to the first main memory 10.

The first main memory 10 is used as a work area for deploying a basic program for the CPU 9 to control the multifunction peripheral 1, a program for executing the image processing method according to the present embodiment, and necessary system data, for example, and is also used to temporarily store data such as image data. The first main memory 10 therefore functions as the image memory.

The I/O ASIC 11 includes external interfaces for providing additional functions to the multifunction peripheral 1, such as a network interface, a universal serial bus (USB) interface, a secure digital (SD) card, an operation unit, a serial peripheral interface (SPI), and an inter-integrated circuit ($I^2C$: registered trademark), for example, a hardware accelerator for increasing the speed of image processing, and an encoding circuit.

The connection between the image processing ASIC 4 and the controller ASIC 5 and the connection between the controller ASIC 5 and the chipset 8 are made by a peripheral component interconnect express (PCIe) bus P1 and a PCIe bus P2, respectively, each of which is a high-speed serial bus that handles requests and responses separately to issue the next request with no need to wait for the response to the current request.

Figure 2:
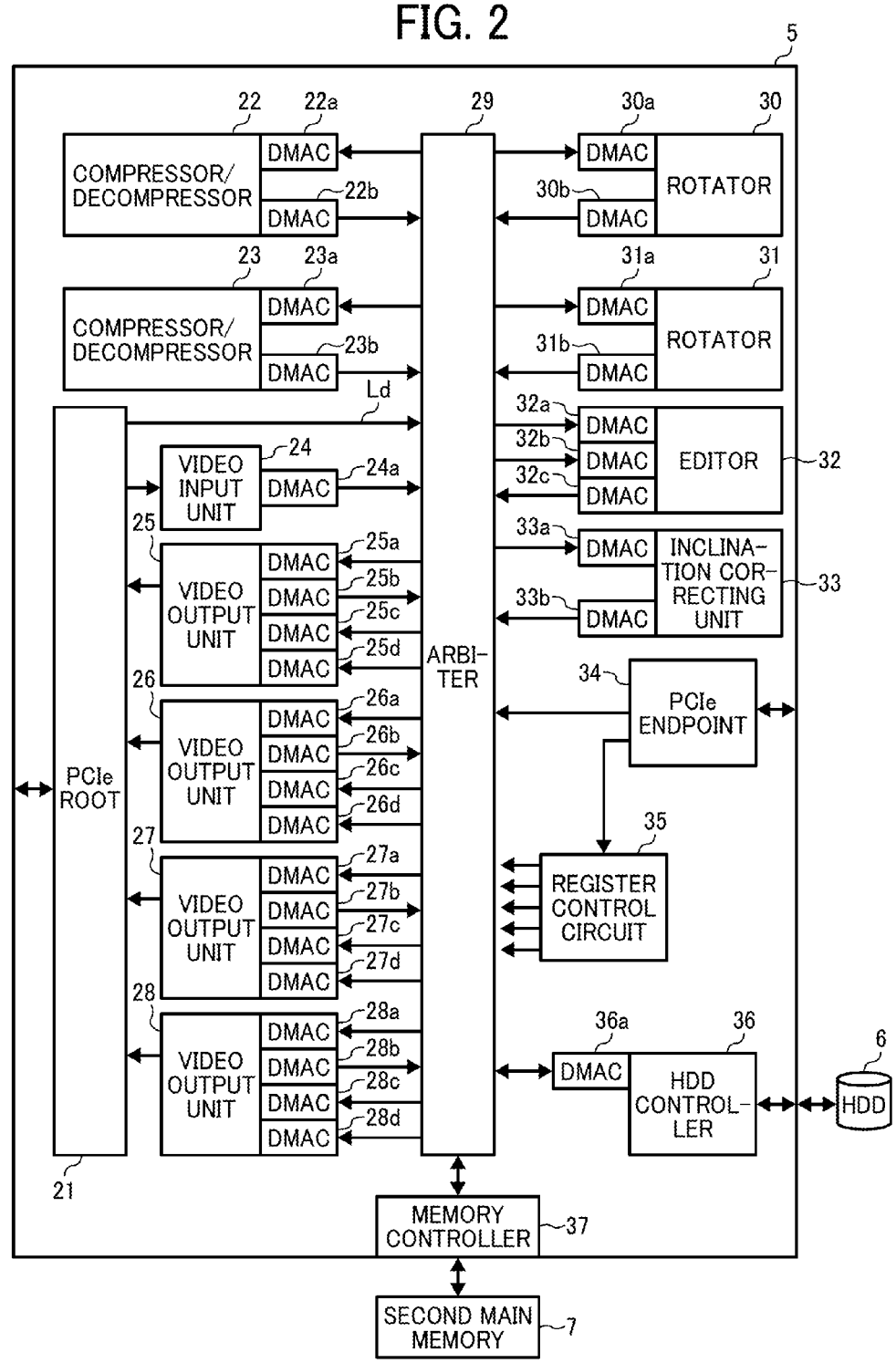
FIG. 2 is a block diagram illustrating a configuration of a controller ASIC of the multifunction peripheral.

The controller ASIC 5 has a configuration illustrated as blocks in FIG. 2. The controller ASIC 5 includes a PCIe root complex (hereinafter simply referred to as PCIe root) 21, a compressor/decompressor 22 with direct memory access controllers (DMACs) 22a and 22b, a compressor/decompressor 23 with DMACs 23a and 23b, a direct video line Ld, a video input unit 24 with a DMAC 24a, a video output unit 25 with DMACs 25a, 25b, 25c, and 25d, a video output unit 26 with DMACs 26a, 26b, 26c, and 26d, a video output unit 27 with DMACs 27a, 27b, 27c, and 27d, a video output unit 28 with DMACs 28a, 28b, 28c, and 28d, an arbiter 29, a rotator 30 with DMACs 30a and 30b, a rotator 31 with DMACs 31a and 31b, an editor 32 with DMACs 32a, 32b, and 32c, an inclination correcting unit 33 with DMACs 33a and 33b, a PCIe endpoint 34, a register control circuit 35, an HDD controller 36 with a DMAC 36a, and a memory controller 37.

The arbiter 29 is connected to all of the DMACs 22a, 22b, 23a, 23b, 24a, 25a to 25d, 26a to 26d, 27a to 27d, 28a to 28d, 30a, 30b, 31a, 31b, 32a to 32c, 33a 33b, and 36a (hereinafter collectively referred to as the DMACs 22a to 36a) and the memory controller 37. The arbiter 29 performs an arbitration process of arbitrating access requests from the DMACs 22a to 36a and the memory controller 37 to access the first main memory 10 or the second main memory 7. To maintain isochronism of lines of the image data read by the scanner 2 (hereinafter referred to as the scanner data) and the image data to be printed by the plotter 3 (hereinafter referred to as the plotter data), the arbiter 29 normally employs an arbitration algorithm that allows the arbiter 29 to preferentially process access requests from the DMAC 24a of the video input unit 24 and the DMACs 25a to 25d, 26a to 26d, 27a to 27d, and 28a to 28d of the video output units 25 to 28.

The PCIe endpoint 34 controls the PCIe bus P2 connected to the chipset 8, and reads data from the first main memory 10 or writes data to the first main memory 10 in accordance with the requests from the DMACs 22a to 36a arbitrated by the arbiter 29. The PCIe endpoint 34 further performs, via the register control circuit 35, read/write control of the CPU 9 via the chipset 8 to control registers of functional modules in the controller ASIC 5. Herein, the functional modules include the compressor/decompressor 22, the compressor/decompressor 23, the video input unit 24, the video output units 25 to 28, the rotators 30 and 31, the editor 32, the inclination correcting unit 33, and the HDD controller 36.

The PCIe root 21 controls the PCIe bus P1 connected to the image processing ASIC 4 to receive the writing of the scanner data and the reading of the plotter data by the image processing ASIC 4.

The compressor/decompressor 22 and the compressor/decompressor 23 read image data from the first main memory 10 by using the DMAC 22a and the DMAC 23a, respectively, compress or decompress the read image data, and write the compressed or decompressed image data back to the first main memory 10 by using the DMAC 22b and the DMAC 23b, respectively.

When the scanner data is processed by the image processing ASIC 4 and input to the video input unit 24 via the PCIe root 21, the video input unit 24 writes the scanner data to the first main memory 10 with the DMAC 24a.

The scanner data processed by the image processing ASIC 4 is also input to the direct video line Ld via the PCIe root 21 to write the scanner data to addresses in the first main memory 10 specified by the image processing ASIC 4.

The video output units 25, 26, 27, and 28 output image data subjected to processing in the controller ASIC 5, such as rotation by the rotators 30 and 31, editing by the editor 32, and positional correction by the inclination correcting unit 33, to the plotter 3 via the PCIe root 21 and the image processing ASIC 4. The video output units 25, 26, 27, and 28 further read from the first main memory 10 the image data compressed by the compressor/decompressor 22 and the compressor/decompressor 23 with the DMACs 25b, 26b, 27b, and 28b, respectively. The video output units 25, 26, 27, and 28 output the image data read and decompressed by the compressor/decompressor 22 and the compressor/decompressor 23 in the controller ASIC 5 directly to the image processing ASIC 4 via the PCIe root 21, without passing the image data through the first main memory 10. The video output units 25, 26, 27, and 28 further read an original image and a stamp image from the first main memory 10 with the DMACs 25b, 26b, 27b, and 28b, respectively, synthesize the stamp image and the original image, and output a resultant synthesized image to the image processing ASIC 4 via the PCIe root 21. The video output units 25, 26, 27, and 28 may also have a function of embedding, for example, pattern data in the image data to protect the image data from unauthorized copying.

The rotators 30 and 31 read image data from the first main memory 10 with the DMAC 30a and the DMAC 31a, respectively, perform the rotation process on the read image data in accordance with register settings by the CPU 9, and write the rotated image data back to the first main memory 10 with the DMAC 30b and the DMAC 31b, respectively.

The editor 32 reads two type of image data from the first main memory 10 with the DMACs 32a and 32b, performs the editing process, such as image synthesis, on the read image data in accordance with register settings by the CPU 9, and writes the edited image data back to the first main memory 10 with the DMAC 32c.

The inclination correcting unit 33 corrects the inclination or positional deviation (i.e., skew) of the image data read by the scanner 2, or corrects the inclination of the image data read from the first main memory 10 in accordance with the inclination of the sheet in the plotter 3. If the scanner 2 includes a document feeder (DF) and the document is conveyed to the reading position of the scanner 2 by the DF, slight positional distortion occurs in the image data read by the scanner 2 owing to the mechanical precision of a document conveyance system of the DF or the scanner 2. In this case, the inclination correcting unit 33 reads the image data written to the first main memory 10 with such an inclination, and writes the image data to the second main memory 7 while correcting the inclination of the image data. Further, when the sheet is conveyed from the sheet feeding cassette to the printing device of the plotter 3 via a sheet conveyance unit, the sheet conveyed to the printing device may be inclined owing to the mechanical precision of a sheet conveyance system. In this case, the inclination correcting unit 33 reads the image data with no inclination from the first main memory 10, performs inclination correction on the image data to cancel the inclination of the sheet, and writes the resultant image data back to the first main memory 10.

To temporarily store the image data to be used by the controller ASIC 5, the HDD controller 36 writes the image data from the first main memory 10 to the HDD 6 with the DMAC 36a. The HDD controller 36 further reads the image data from the HDD 6, and writes the read image data to the first main memory 10.

The memory controller 37 writes image data from the arbiter 29 to the second main memory 7, or reads and outputs image data from the second main memory 7 to the arbiter 29.

In the operations of the compressor/decompressor 22, the compressor/decompressor 23, the video input unit 24, the video output units 25 to 28, the rotators 30 and 31, the editor 32, and the inclination correcting unit 33, the controller ASIC 5 uses the first main memory 10 to perform the image data processing. Alternatively, the controller ASIC 5 may use the second main memory 7 to perform the image data processing in these operations.

Figure 3:
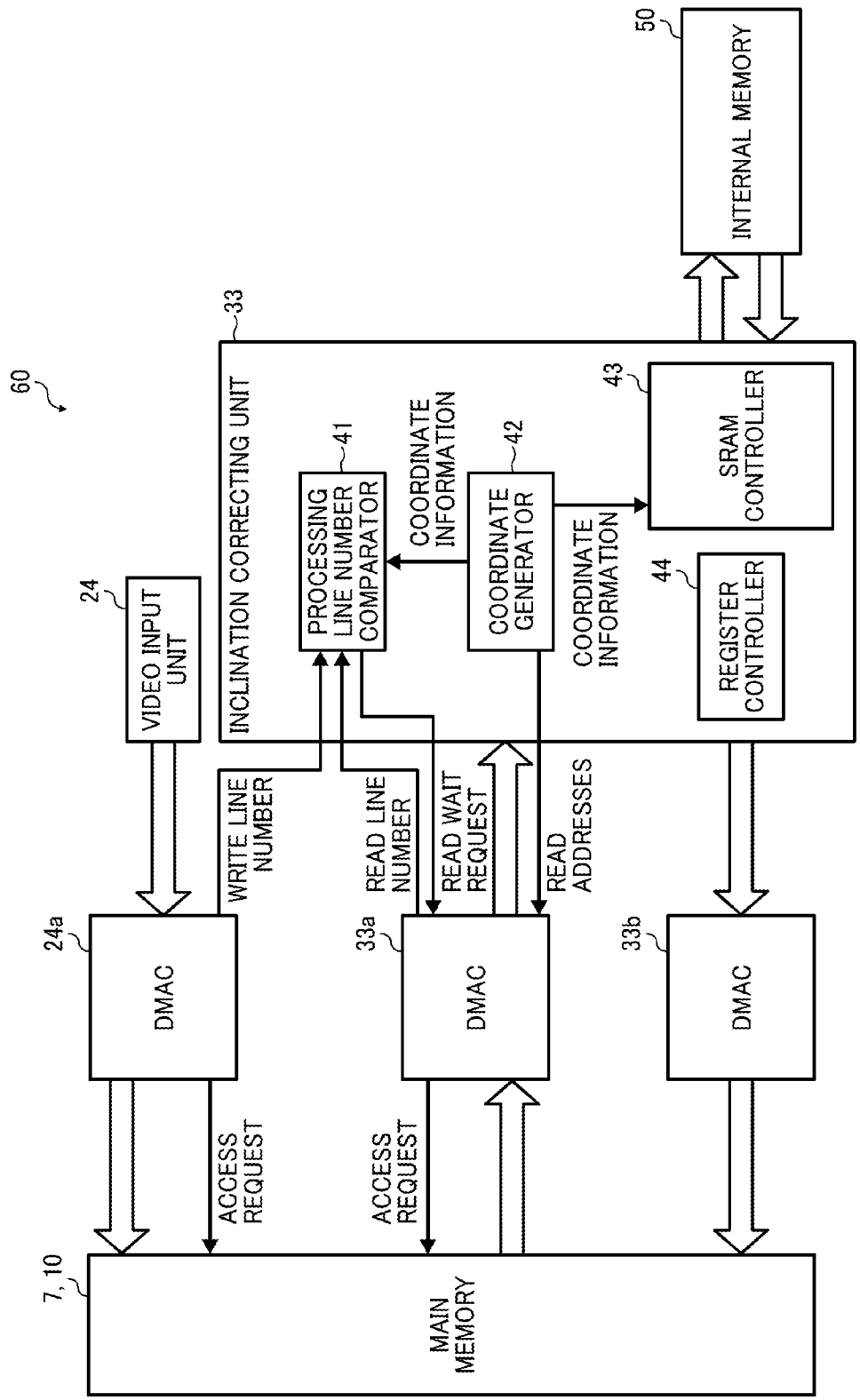
FIG. 3 is a block diagram illustrating a configuration of an image processing unit of the multifunction peripheral.

The inclination correcting unit 33 and peripheral circuits thereof cooperate to form an image processing unit 60 (i.e., an image processing device), as illustrated in FIG. 3. That is, the image processing unit 60 includes the DMAC 24a of the video input unit 24, the inclination correcting unit 33, the DMACs 33a and 33b provided to the inclination correcting unit 33, and an internal memory 50. As illustrated in FIG. 3, the inclination correcting unit 33 includes a processing line number comparator 41, a coordinate generator 42, a static random access memory (SRAM) controller 43, and a register controller 44, and is connected to the DMACs 33a and 33b and the internal memory 50.

The internal memory 50 is formed of SRAMs corresponding to a plurality of lines, such as eight lines, for example. In the controller ASIC 5, the internal memory 50 is used as a line first-in, first-out (FIFO) memory.

The inclination correcting unit 33 performs an inclination correction process on the image data written to the first main memory 10 or the second main memory 7 by the DMAC 24a of the video input unit 24, and writes the inclination-corrected image data back to the first main memory 10 or the second main memory 7. The image processing unit 60 is capable of using either the first main memory 10 or the second main memory 7 as a main memory. For the sake of clarity of description, however, the following description will be given on the assumption that the image processing unit 60 uses the second main memory 7 as the main memory.

The DMAC 24a of the video input unit 24 is a write DMAC that writes the image data read by the scanner 2 to the second main memory 7 as a raster image. If the read image data is inclined, therefore, the image data is written to the second main memory 7 with the inclination. The DMAC 24a notifies the processing line number comparator 41 of the inclination correcting unit 33 of the number of lines of the image data written to the second main memory 7 as a write line number. The DMAC 24a manages the number of lines written to the second main memory 7 based on a main scanning size set by the CPU 9. The DMAC 24a functions as a data writing circuit.

As described above, the inclination correcting unit 33 is connected to the DMAC 33a and the DMAC 33b, which are a read DMAC and a write DMAC, respectively.

Based on read addresses input from the coordinate generator 42 of the inclination correcting unit 33, the DMAC 33a issues a memory access request to access the second main memory 7, and reads the image data from the read addresses in the second main memory 7. The DMAC 33a transmits the image data read from the second main memory 7 to the SRAM controller 43 of the inclination correcting unit 33, detects the number of lines of the image data read from the second main memory 7, and notifies the processing line number comparator 41 of the detected number of lines as a read line number.

If a read wait request (i.e., standby request) is input from the processing line number comparator 41, the DMAC 33a waits (i.e., stands by) for access to the second main memory 7 during the time in which the read wait request is input. That is, during the time in which the read wait request is input, the DMAC 33a stops reading the image data from the second main memory 7 and waits to be allowed to read the image data until the read wait request is cancelled, i.e., until the cancellation of the standby state.

The DMAC 33b receives from the inclination correcting unit 33 the image data written in the internal memory 50, and writes the received image data to the second main memory 7.

The register controller 44 is accessed by the CPU 9, receives parameters related to the inclination correction of image data from the CPU 9, and supplies the received parameters to the processing line number comparator 41, the coordinate generator 42, and the SRAM controller 43 of the inclination correcting unit 33.

The coordinate generator 42 receives document inclination information representing the inclination of the document and sheet inclination information representing the inclination of the sheet. Based on the document inclination information and the sheet inclination information, the coordinate generator 42 generates two-dimensional coordinates (X, Y) representing positions in the main scanning direction and positions in the sub-scanning direction of the image data. The coordinate generator 42 therefore functions as a coordinate generating circuit. The coordinate generator 42 outputs the generated coordinate information to the processing line number comparator 41 and the SRAM controller 43. The document inclination information corresponds to the inclination detected by the document skew sensor that detects the inclination of the document at the reading position of the scanner 2. The sheet inclination information corresponds to the inclination detected by a sheet skew sensor that detects the inclination of the sheet conveyed to a printing position of the plotter 3. For the sake of clarity of description, the following description will only discuss the inclination of the document and be given on the assumption that the coordinate generator 42 generates the coordinates (X, Y) based on the document inclination information. The coordinates (X, Y) represent reading positions for reading the image data written in the second main memory 7.

The coordinate generator 42 further detects, from the generated Y coordinates, the minimum Y coordinate in each of divided areas of the image data, and holds the detected minimum Y coordinate as the minimum Y coordinate value (i.e., minimum sub-scanning coordinate). Specifically, the coordinate generator 42 equally divides the image data into n areas in the main scanning direction (i.e., the X direction), and detects the minimum Y coordinate (i.e., minimum sub-scanning coordinate) in each of the n equally divided areas in the X direction. That is, the coordinate generator 42 generates the coordinates (X, Y) of each of pixels of the image data. The coordinate generator 42 therefore functions as a minimum sub-scanning coordinate detecting circuit. The number n for equally dividing the image data in the main scanning direction will hereinafter be referred to as the division number.

In accordance with the held minimum Y coordinate value, the coordinate generator 42 generates physical addresses (i.e., read addresses) for reading the image data from the second main memory 7 with the inclination of the image data corrected, and outputs the generated read addresses to the DMAC 33a. The coordinate generator 42 therefore functions as a read address generating circuit.

As described above, the DMAC 33a reads the image data from the second main memory 7 with the inclination of the image data corrected in accordance with the read addresses received from the coordinate generator 42. The DMAC 33a outputs the read image data to the SRAM controller 43, and outputs the read line number to the processing line number comparator 41. The DMAC 33a therefore functions as a data reading circuit.

Based on the coordinate information from the coordinate generator 42, the SRAM controller 43 sequentially writes the divided areas of the image data received from the DMAC 33a to the internal memory 50, which serves as a temporary memory.

Based on the coordinate information from the coordinate generator 42, the SRAM controller 43 further generates read addresses for reading the image data from the internal memory 50, reads the image data from the internal memory 50 with the inclination of the image data corrected in accordance with the generated read addresses, and transmits the read image data to the DMAC 33b. The SRAM controller 43 therefore functions as a memory control circuit.

As described above, the DMAC 33b writes the image data received from the inclination correcting unit 33 to the second main memory 7. The DMAC 33b therefore functions as a write-back circuit.

The processing line number comparator 41 outputs or cancels the read wait request to the DMAC 33a by controlling the image data in the second main memory 7 based on the write line number received from the DMAC 24a, the read line number received from the DMAC 33a, and the coordinate information received from the coordinate generator 42. The processing line number comparator 41 therefore functions as a reading control circuit.

Specifically, based on the coordinate information from the coordinate generator 42, the processing line number comparator 41 detects the minimum Y coordinate value and the maximum Y coordinate value in each of the divided areas. The difference between the minimum Y coordinate value and the maximum Y coordinate value is proportional to the degree of the inclination of the image data. The processing line number comparator 41 compares the difference between the write line number and the read line number (i.e., |write line number−read line number|) with the difference between the maximum Y coordinate value and the minimum Y coordinate value (i.e., |maximum Y coordinate value−minimum Y coordinate value|). The processing line number comparator 41 outputs the read wait request to the DMAC 33*a* during the time in which a read wait condition is satisfied. The read wait condition is that the difference between the write line number and the read line number is less than the difference between the maximum Y coordinate value and the minimum Y coordinate value, i.e., |write line number−read line number|<|maximum Y coordinate value−minimum Y coordinate value|.

That is, the processing line number comparator 41 outputs or cancels the read wait request based on the read wait condition that the difference between the write line number (i.e., the number of the lines of the image data written to the second main memory 7) and the read line number (i.e., the number of the lines of the image data read from the second main memory 7) is less than the difference between the maximum Y coordinate value and the minimum Y coordinate value in each of the divided areas of the image data. Accordingly, the image data reading from the second main memory 7 is appropriately controlled for each of the divided areas of the image data, and the inclination of the image data is corrected with effective use of the second main memory 7 having a small capacity.

The multifunction peripheral 1 of the present embodiment is configured as an image forming apparatus that reads, from a computer-readable recording medium, the program for executing the image processing method according to the present embodiment, and installs the program to the first main memory 10 or the HDD 6, for example. The computer-readable recording medium may be a random access memory (ROM), an electrically erasable and programmable ROM (EEPROM), an erasable and programmable ROM (EPROM), a flash memory, a flexible disk, a compact disc-ROM (CD-ROM), a CD-rewritable (CD-RW), a digital versatile disk (DVD), a USB memory, an SD card, or a magneto-optical (MO) disc, for example. The program for executing the image processing method according to the present embodiment is a computer-executable program described in a legacy programming language or an object-oriented programming language, such as assembler, C, C++, C#, or Java (registered trademark), and may be distributed as stored in the above-described recording medium.

With the execution of the program, the image processing unit 60 is realized which serves as the image processing device of the image forming apparatus to execute the image processing method according to the present embodiment. The image processing method according to the present embodiment appropriately performs the inclination correction on the image data with a small-capacity image memory.

Operations of the present embodiment will now be described.

In the multifunction peripheral 1 of the present embodiment, the inclination correcting unit 33 appropriately performs the inclination correction on the image data with the first main memory 10 or the second main memory 7 serving as the small-capacity image memory.

The following description will be given of a case of storing the image data of the document read by the scanner 2 into the first main memory 10 or the second main memory 7 while correcting the inclination of the image data caused by the inclination of the document. The present embodiment is also applicable to a case in which the inclination is found not in the input image data but in the sheet on which the image is to be formed by the plotter 3 based on the image data.

Figure 4:
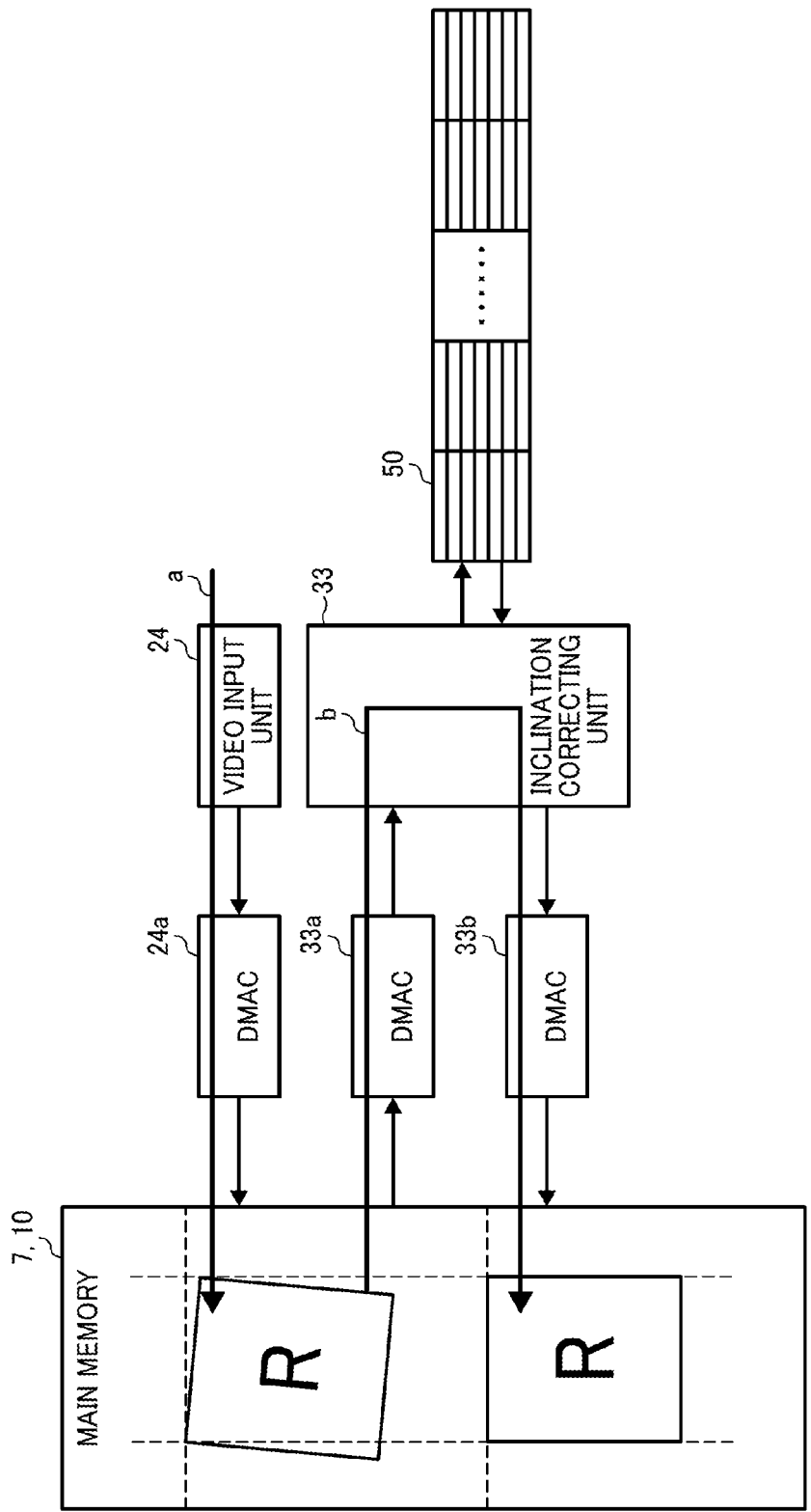
FIG. 4 is a diagram illustrating an inclination correction process.
Figure 5:
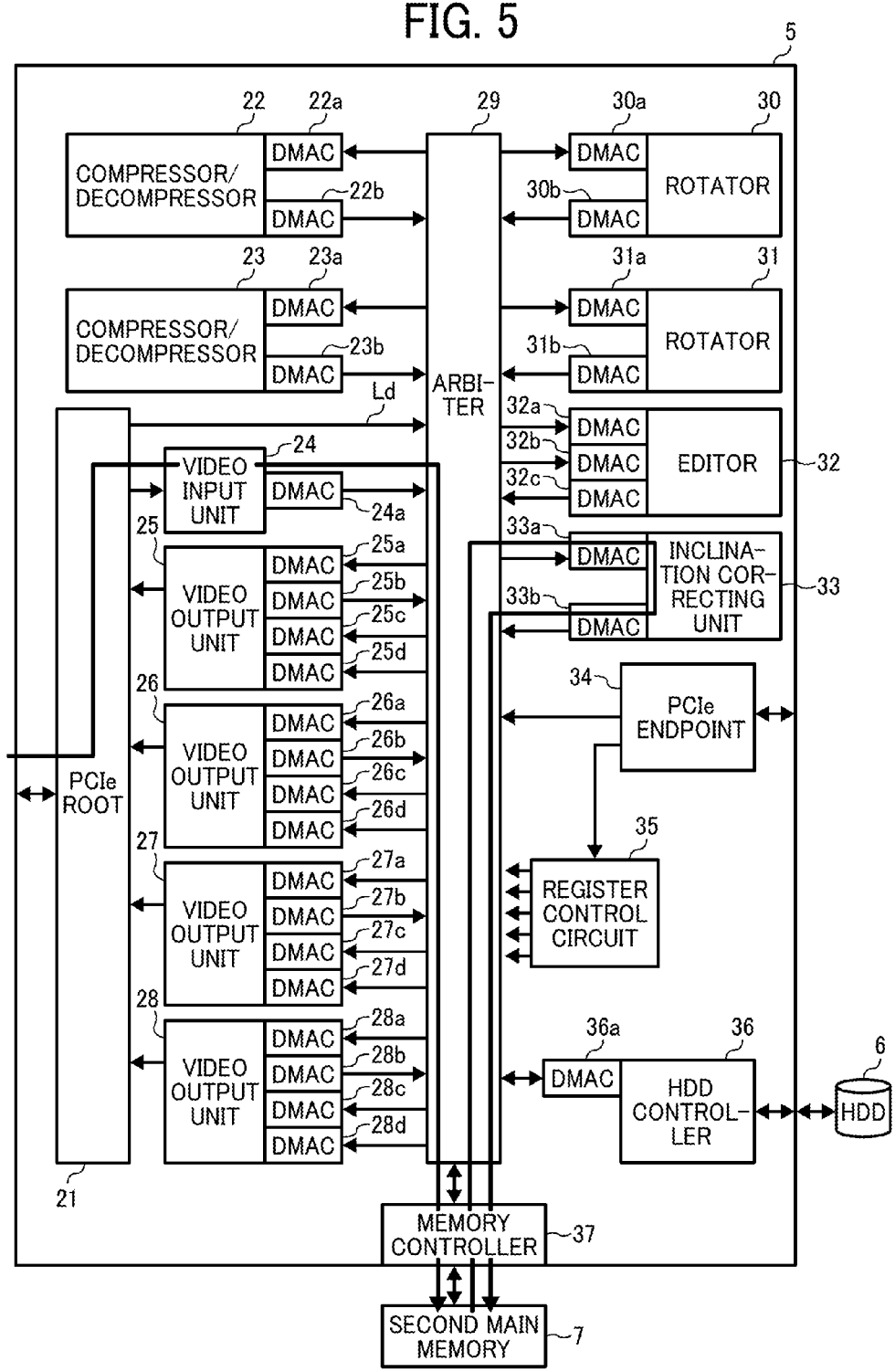
FIG. 5 is a diagram illustrating a flow of image data in the controller ASIC during the inclination correction process using a second main memory of the multifunction peripheral.

If the image data read by the scanner 2 is inclined, the DMAC 24*a* (i.e., a write DMAC) of the video input unit 24 writes the image data to the first main memory 10 or the second main memory 7 with the inclination, as illustrated in FIG. 4. The multifunction peripheral 1 performs the inclination correction on the image data by using the first main memory 10 or the second main memory 7 as the small-capacity image memory. For the sake of clarity of description, however, the following description will be given on the assumption that the multifunction peripheral 1 uses the second main memory 7 as the small-capacity image memory. In this case, the controller ASIC 5 transfers the image data, as indicated by thick solid arrows in FIG. 5. Specifically, the controller ASIC 5 writes the image data from the scanner 2 to the second main memory 7 via the PCIe root 21, the video input unit 24, the DMAC 24*a*, the arbiter 29, and the memory controller 37. The controller ASIC 5 then transfers the image data from the second main memory 7 to the inclination correcting unit 33 via the memory controller 37, the arbiter 29, and the DMAC 33*a*, and writes the image data back to the second main memory 7 from the inclination correcting unit 33 via the DMAC 33*b*.

As indicated by a thick solid arrow a in FIG. 4, the DMAC 24*a* writes the inclined image data to the second main memory 7 as a raster image with an inclination. In FIG. 4, each rectangle enclosing a letter "R" represents the image data written in the second main memory 7, and the upper image data is written with an inclination.

In the inclination correcting unit 33, the image data written with the inclination to the second main memory 7 by the DMAC 24*a* is read by the DMAC 33*a* with the inclination corrected based on the coordinate information of the image data, and is written back to the second main memory 7 via the internal memory 50. Specifically, as indicated by a thick solid arrow b in FIG. 4, the image data written with the inclination to the second main memory 7 is read with the inclination corrected and written back to the second main memory 7 by the inclination correcting unit 33.

In this process, the inclination correcting unit 33 performs the inclination correction with the small-capacity second main memory 7 by performing read wait control based on the write line number, i.e., the number of the lines of the image data written to the second main memory 7 by the DMAC 24*a*, and the read line number, i.e., the number of the lines of the image data read from the second main memory 7 by the DMAC 33*a*.

The multifunction peripheral 1 executes the inclination correction of the image data in accordance with the sequence illustrated in FIGS. 6A and 6B. As illustrated in FIG. 6A, in the inclination correction by the multifunction peripheral 1, the CPU 9 first sets the parameters for executing the inclination correction in the register controller 44 of the inclination correcting unit 33. Then, the register controller 44 sets the thus-set parameters in related units such as the coordinate generator 42.

Based on the set parameters, the coordinate generator 42 generates the coordinate information represented by the coordinates (X, Y) corresponding to the inclination of the document, i.e., the inclination of the image data. The coordinate generator 42 then outputs the generated coordinate information to the processing line number comparator 41, the DMAC 33*a*, and the SRAM controller 43.

It is assumed here that the image data has a resolution of 1200 dots per inch (dpi) and includes 1024 pixels in each of the divided areas of the image data, i.e., 16384 pixels in each of the lines of the image data, as illustrated in FIG. 7. In this case, the DMAC 24a writes the image data in line units to the second main memory 7 with the inclination. Then, based on the inclination of the document detected by the document skew sensor, the coordinate generator 42 generates the two-dimensional coordinates (X, Y) in the main scanning direction (i.e., X direction) and the sub-scanning direction (i.e., Y direction) of the image data in the second main memory 7. The coordinate generator 42 outputs the coordinate information to the processing line number comparator 41, the DMAC 33a, and the SRAM controller 43.

Figure 8:
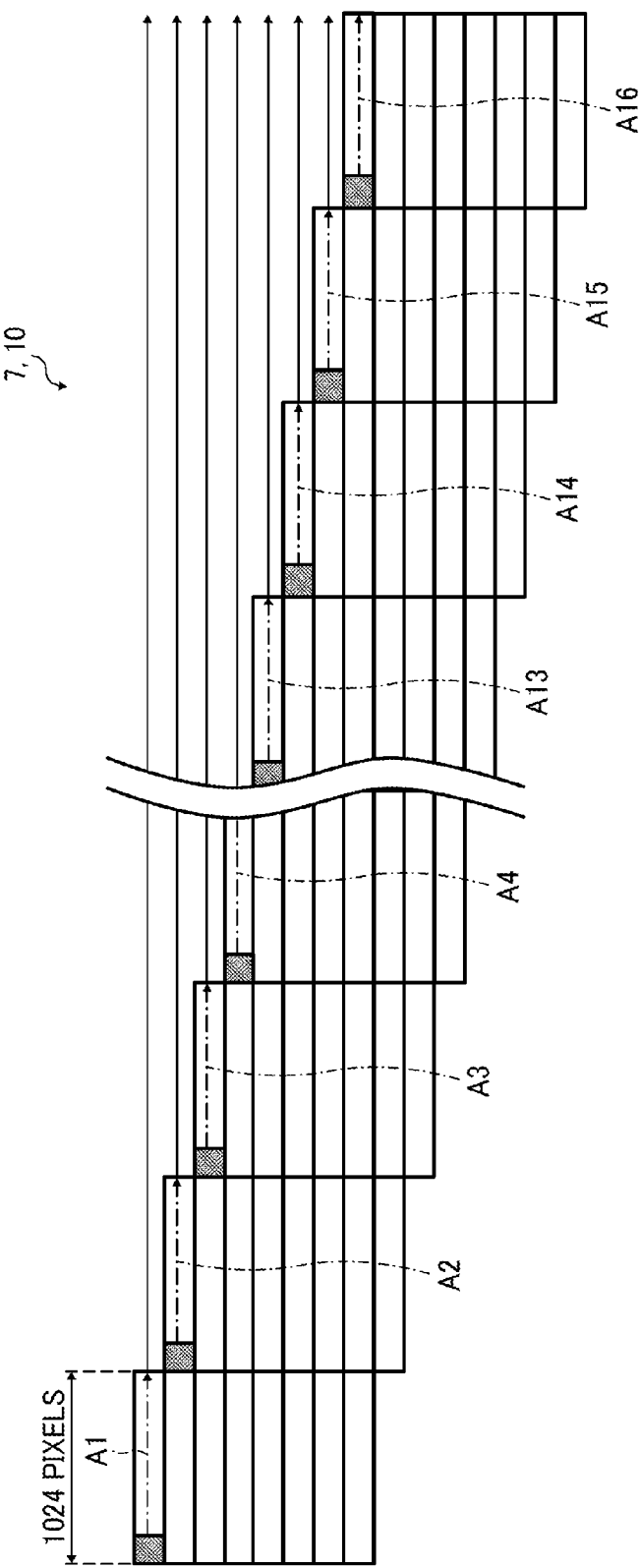
FIG. 8 is a diagram illustrating details of an example of image data stored in the second main memory in FIG. 6B.
Figure 9:
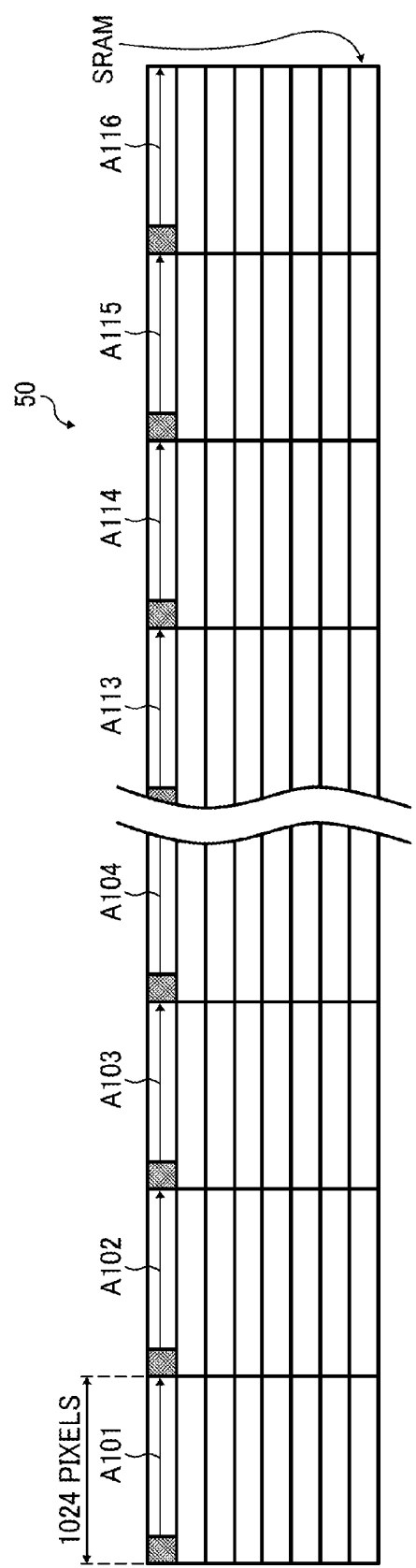
FIG. 9 is a diagram illustrating a process of writing image data to an internal memory of the image processing unit.

The coordinate generator 42 further divides the image data into the n divided areas (16 divided areas in the example of FIG. 7) in the main scanning direction (i.e., X direction), detects, from the Y coordinates of the generated coordinates (X, Y), the minimum Y coordinate in each of the divided areas, and holds the detected minimum Y coordinate as the minimum Y coordinate value. In accordance with the minimum Y coordinate value, the coordinate generator 42 generates the read addresses for reading the image data from the second main memory 7, and outputs the generated read addresses to the DMAC 33a. Specifically, the coordinate generator 42 holds the minimum physical addresses of the respective divided areas, as indicated by solid black squares in FIGS. 7 and 8. The coordinate generator 42 generates the read addresses based on these minimum physical addresses of the respective divided areas, and outputs the generated read addresses to the DMAC 33a. In FIGS. 7 and 8, each of the divided areas is represented by a rectangle of 1 pixel in the sub-scanning direction by 1024 pixels in the main scanning direction.

Referring back to FIGS. 6A and 6B, in the multifunction peripheral 1, the CPU 9 then activates the DMAC 24a (i.e., a write DMAC), and further activates the DMAC 33a (i.e., a read DMAC). The activated DMAC 24a starts writing the image data read by the scanner 2 to the second main memory 7 as a raster image, as described above, and notifies the processing line number comparator 41 of the number of written lines as the write line number during the time in which the DMAC 24a is activated. The activated DMAC 33a reads the image data corresponding to the read addresses from the second main memory 7 based on the read addresses received from the coordinate generator 42, as described above, and notifies the processing line number comparator 41 of the number of read lines as the read line number during the time in which the DMAC 33a is activated.

In FIGS. 7 and 8, the DMAC 33a first reads the 1024 pixels (each with eight bits) of a first divided area A1 of the image data from the second main memory 7, as indicated by a corresponding dash-dotted arrow in FIG. 8, and transfers the 1024 pixels of the image data to the SRAM controller 43. The SRAM controller 43 writes the 1024 pixels of the image data to a first block A101 of the first SRAM of the eight SRAMs in the internal memory 50, as indicated by a corresponding solid arrow in FIG. 9.

The DMAC 33a similarly reads the 1024 pixels of a second divided area A2 of the image data from the second main memory 7, as indicated by a corresponding dash-dotted line in FIG. 8, and transfers the 1024 pixels of the image data to the SRAM controller 43. The SRAM controller 43 writes the 1024 pixels of the image data to a second block A102 of the first SRAM of the eight SRAMs in the internal memory 50, as indicated by a corresponding solid arrow in FIG. 9.

The DMAC 33a and the SRAM controller 43 sequentially perform the reading process and the writing process, respectively, to thereby transfer one line of the image data from the second main memory 7 to the first SRAM of the internal memory 50.

If the SRAM controller 43 includes toggle buffers each having a capacity of 1024 pixels, the image processing unit 60 may perform the above-described operation by operating the toggle buffers in parallel.

The DMAC 33a and the SRAM controller 43 repeat the reading process and the writing process, respectively, by the number of times corresponding to the number of the divided areas, i.e., 16 times in the present embodiment, to thereby transfer one line of the image data from the second main memory 7 to the internal memory 50.

After executing the reading process on one line of the image data, the DMAC 33a notifies the processing line number comparator 41 of the read line number. Each time the DMAC 33a completes reading one of the divided areas of the image data, the DMAC 33a counts read completion flags. If the count of the read completion flags reaches the number of the divided areas in one line of the image data, the DMAC 33a determines that one line of the image data has been read, and notifies the processing line number comparator 41 of the read line number. Alternatively, the DMAC 33a may count read pixels of the image data, determine that one line of the image data has been read when the count reaches 16384 (i.e., 1024 pixels×16 bytes), for example, and notify the processing line number comparator 41 of the read line number.

In accordance with the coordinate information from the coordinate generator 42, the SRAM controller 43 further generates the read addresses for reading the image data from the internal memory 50. Based on the generated read addresses, the SRAM controller 43 reads from the internal memory 50 the image data written thereto as described above, and transfers the inclination-corrected image data to the DMAC 33b (i.e., a write DMAC). The DMAC 33b writes the transferred image data to the second main memory 7 with the inclination of the image data corrected, as illustrated in FIG. 4.

The processing line number comparator 41 outputs or cancels the read wait request to the DMAC 33a by controlling the image data in the second main memory 7 based on the write line number received from the DMAC 24a, the read line number received from the DMAC 33a, and the coordinate information received from the coordinate generator 42.

Specifically, the processing line number comparator 41 detects the minimum Y coordinate value and the maximum Y coordinate value from the coordinate information received from the coordinate generator 42 based on the minimum coordinate in each of the divided areas, as described above. The processing line number comparator 41 compares the difference between the write line number and the read line number (i.e., |write line number−read line number|) with the difference between the maximum Y coordinate value and the minimum Y coordinate value (i.e., |maximum Y coordinate value−minimum Y coordinate value|). The difference between the maximum Y coordinate value and the minimum Y coordinate value is proportional to the degree of the inclination of the image data. In the above-described example of FIG. 8, the inclination of the image data corresponds to 16 pixels.

The processing line number comparator 41 outputs the read wait request to the DMAC 33a during the time in which the read wait condition that the difference between the write line number and the read line number is less than the difference between the maximum Y coordinate value and the minimum Y coordinate value (i.e., |write line number−read line number|<|maximum Y coordinate value−minimum Y coordinate value|) is satisfied.

That is, the processing line number comparator 41 outputs or cancels the read wait request based on the read wait condition that the difference between the write line number and the read line number of the second main memory 7 is less than the difference between the maximum Y coordinate value and the minimum Y coordinate value in each of the divided areas of the image data.

The read wait condition is satisfied after the activation of the DMAC 24*a* and the DMAC 33*a*. As illustrated in FIG. 6B, therefore, the processing line number comparator 41 outputs the read wait request to the DMAC 33*a* until the read wait condition stops being satisfied. During the time in which the read wait request is output, the DMAC 24*a* performs the process of writing image data to the second main memory 7, and the DMAC 33*a* stops reading image data from the second main memory 7. If the read wait condition stops being satisfied, the processing line number comparator 41 cancels the read wait request to the DMAC 33*a*, as illustrated in FIG. 6B. In response to the cancellation of the read wait request, the DMAC 33*a* starts reading image data from the second main memory 7 and transferring the read image data to the internal memory 50. The processing line number comparator 41 outputs or cancels the read wait request based on the read wait condition of the image data writing to the second main memory 7 by the DMAC 24*a* and the image data reading from the second main memory 7 by the DMAC 33*a*.

Accordingly, the image data reading from the second main memory 7 is appropriately controlled for each of the divided areas of the image data, and the inclination of the image data is corrected with effective use of the small-capacity second main memory 7.

Figure 10:
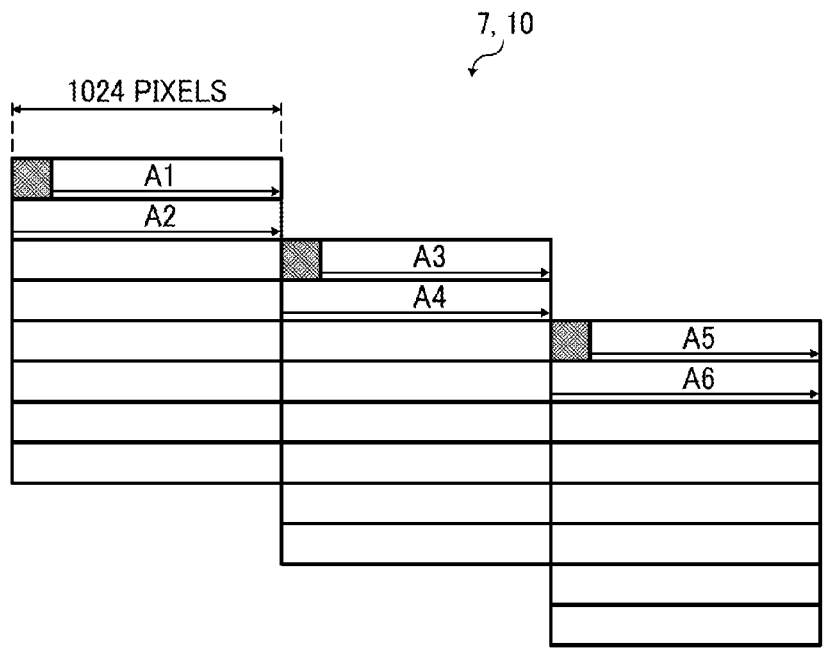
FIG. 10 is a diagram illustrating an example of image data steeply inclined downward to the right and stored in the first or second main memory.

In accordance with an increase in the inclination of the image data, the inclination correcting unit 33 changes the number of divided areas based on the number of SRAMs in the internal memory 50 and the number of pixels in each of the lines of the image data. For example, if the image data has a steep inclination corresponding to 32 pixels, as illustrated in FIG. 10, the difference between the minimum Y coordinate value and the maximum Y coordinate value of the minimum Y coordinates of the divided areas generated by the coordinate generator 42 is twice the division number n. In this case, based on this difference corresponding to twice the division number n, the coordinate generator 42 generates the read addresses for reading the image data from the second main memory 7 in the order of divided areas A1, A2, A3, A4, A5, A6, . . . , and A16, as indicated by solid arrows in FIG. 10. This configuration also applies to the case in which the first main memory 10 is used as the main memory in place of the second main memory 7.

Specifically, the coordinate generator 42 first generates the read address for reading the 1024 pixels of the first divided area A1 by using the minimum Y coordinate of the first divided area A1. Then, the DMAC 33*a* reads the 1024 pixels of the first divided area A1 based on the generated read address, and transfers the read 1024 pixels to the SRAM controller 43. The coordinate generator 42 then adds the addresses of one line to the read address of the first divided area A1 to thereby calculate the initial address of the second divided area A2, and generates and transmits the read address for reading the 1024 pixels of the second divided area A2 to the DMAC 33*a*. Based on the read address of the second divided area A2, the DMAC 33*a* reads and transfers the 1024 pixels of the second divided area A2 to the SRAM controller 43. Similarly, the coordinate generator 42 generates and transfers the read addresses for reading the third to sixteenth divided areas A3 to A16 of the image data to the DMAC 33*a*, and the DMAC 33*a* reads the third to sixteenth divided areas A3 to A16 of the image data based on the read addresses. Herein, the second divided area A2 is arranged in the sub-scanning direction relative to the first divided area A1, and the third divided area A3 is arranged in the main scanning direction relative to the second divided area A2. Thereafter, the coordinate generator 42 similarly generates the read addresses for reading the remaining divided areas, which are arranged in pairs each having two divided areas aligned in the sub-scanning direction and the lower divided area of the pair followed by the upper divided area of the next pair in the main scanning direction.

In this case, each time the DMAC 33*a* completes reading one of the divided areas of the image data, the DMAC 33*a* counts the read completion flags. If the count of the read completion flags reaches the number of the divided areas in two lines (i.e., the division number n×2), the DMAC 33*a* determines that two lines of the image data have been read, and notifies the processing line number comparator 41 of the read line number. Alternatively, the DMAC 33*a* may count the read pixels of the image data, determine that two lines of the image data have been read when the count reaches 32768 (i.e., 1024 pixels×16 bytes×2), for example, and notify the processing line number comparator 41 of the read line number.

Further, in this case, the processing line number comparator 41 outputs or cancels the read wait request based on the read wait condition in a similar manner as in the above-described operation.

Figure 11:
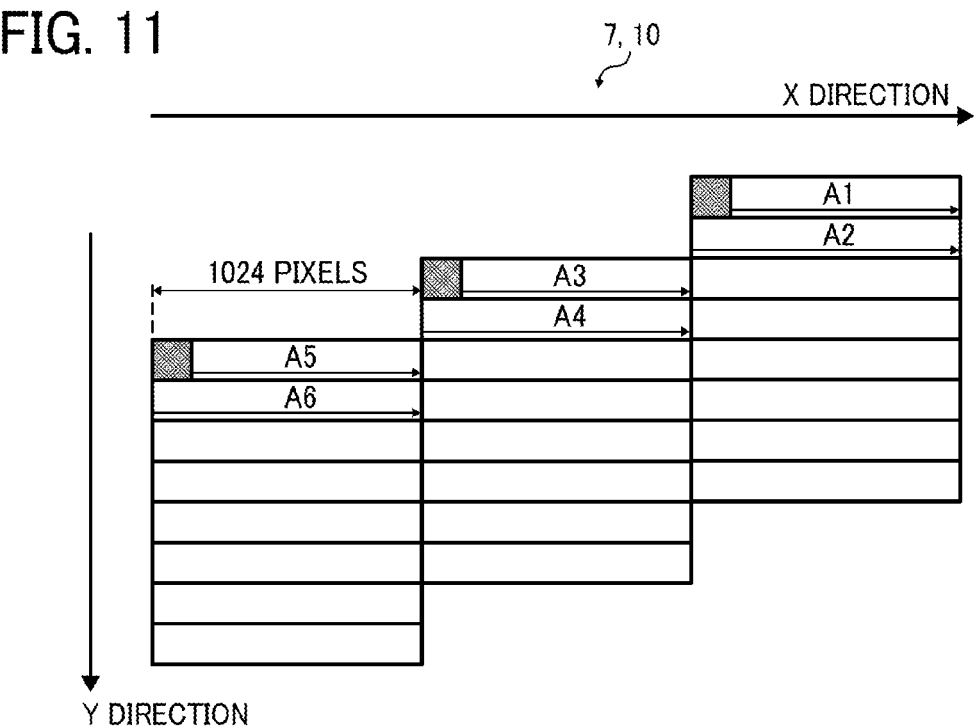
FIG. 11 is a diagram illustrating an example of image data steeply inclined downward to the left and stored in the first or second main memory.

The multifunction peripheral 1 similarly executes the above-described inclination correction process on image data inclined downward to the left (i.e., inclined upward to the right), as illustrated in FIG. 11, as well as on the image data inclined downward to the right in the foregoing example. In this case, the DMAC 33*a* of the multifunction peripheral 1 reads the image data from the first main memory 10 or the second main memory 7 in the order of divided areas A1, A2, A3, A4, A5, A6, . . . , and A16, as illustrated in FIG. 11, and transfers the read image data to the internal memory 50.

In this case, the coordinate generator 42 compares the minimum Y coordinate of the minimum divided area and the minimum Y coordinate of the maximum divided area in the generated minimum Y coordinates of the divided areas. In this example, the minimum divided area is a divided area having the minimum X value in the X direction as illustrated in FIG. 11. The maximum divided area is a divided area having the maximum X value in the X direction as illustrated in FIG. 11. If the minimum Y coordinate of the minimum divided area is greater than the minimum Y coordinate of the maximum divided area, the coordinate generator 42 determines that the image data is inclined downward to the left (i.e., inclined upward to the right).

If the image data is inclined downward to the left, the coordinate generator 42 generates read addresses for reading the image data in the order of the divided areas A1, A2, A3, A4, A5, A6, . . . , and A16, as in FIG. 11, and outputs the generated read addresses to the DMAC 33*a*. Based on the read addresses, the DMAC 33*a* reads and transfers, in units of 1024 pixels, pairs of two divided areas of the image data successive in the Y direction to the SRAM controller 43, and notifies the processing line number comparator 41 of the read line number in units of two lines. If the SRAM controller 43 finds from the coordinate information from the coordinate generator 42 that the image data is inclined downward to the left, the SRAM controller 43 writes the image data in the units of 1024 pixels transferred from the DMAC 33a to the internal memory 50, starting from a block of a SRAM corresponding to the maximum divided area.

The foregoing description has focused on the inclined image data of the image of the document read by the scanner 2, but is similarly applicable to the image data input from an external apparatus such as a computer, for example The inclination correction on the image data from the external apparatus is performed when the inclination is found in the input image data, or when the inclination is found not in the input image data but in the sheet (i.e., output medium) onto which the image data is output. The inclination of the sheet is caused by various factors, such as the mechanical precision of the sheet conveyance path and the temperature inside the multifunction peripheral 1. If the inclination is found in the input image data, and if the inclination information of the inclination is transmitted to the multifunction peripheral 1 from the external apparatus together with the image data, the multifunction peripheral 1 addresses the inclination by performing a process similar to the above-described process of correcting the inclination of the image data read by the scanner 2.

If the inclination is found not in the input image data but in the sheet, on the other hand, the multifunction peripheral 1 outputs the image data as inclined in accordance with the inclination of the sheet, to thereby output the image on the sheet such that the image is not inclined relative to the sheet.

Specifically, to print out the image with the plotter 3 based on the image data received from the external apparatus, for example, the multifunction peripheral 1 converts the image data into bitmap data and stores the converted image data in the first main memory 10 or the second main memory 7. The multifunction peripheral 1 then detects the inclination of the sheet conveyed to the printing device of the plotter 3 with the sheet skew sensor disposed on the sheet conveyance path, and transmits the inclination information of the detected inclination to the CPU 9.

In this case, the image processing unit 60 reads the stored image data from the first main memory 10 or the second main memory 7 in a similar manner as in the foregoing reading operation in accordance with the inclination information of the sheet to cancel the inclination of the sheet. If the sheet is inclined downward to the right or left in this case, the image processing unit 60 reads the image data from the first main memory 10 or the second main memory 7 with an inclination for cancelling the inclination of the sheet.

With the image data thus read with the inclination from the first main memory 10 or the second main memory 7, the image is printed out on the sheet with the inclination of the image relative to the sheet corrected.

When the sheet (i.e., output medium) is inclined, therefore, the multifunction peripheral 1 outputs the image data as inclined in accordance with the inclination of the output medium while adjusting the read addresses at low cost, and thereby outputs the image in an appropriate direction at low cost.

As described above, the multifunction peripheral 1 of the present embodiment includes the image processing unit 60 as an image processing device. In the image processing unit 60, the inclination correcting unit 33 of the controller ASIC 5 corrects the inclination of the image data written to the first main memory 10 or the second main memory 7 having a predetermined capacity (i.e., the image memory) by using the internal memory 50 having a memory capacity of a predetermined number of lines (i.e., the temporary memory). The image processing unit 60 includes the DMAC 24a (i.e., the data writing circuit), the coordinate generator 42 (i.e., the coordinate generating circuit), the DMAC 33a (i.e., the data reading circuit), the processing line number comparator 41 (i.e., the reading control circuit), and the SRAM controller 43 (i.e., the memory control circuit).

The DMAC 24a writes the image data to the first main memory 10 or the second main memory 7, and detects the number of lines of the image data written to the first main memory 10 or the second main memory 7. The coordinate generator 42 generates the coordinate information based on the inclination information. The coordinate information includes the coordinate in the main scanning direction and the coordinate in the sub-scanning direction that represent the position of each of the pixels of the image data relative to the sheet (i.e., the output medium) onto which the image data is to be output. The inclination information represents the inclination of the image data in the first main memory 10 or the second main memory 7 relative to the output medium. The coordinate generator 42 further detects, from the coordinate information, the minimum Y coordinate (i.e., the minimum sub-scanning coordinate) in each of the plurality of divided areas of the image data divided by a predetermined division number in the main scanning direction. The minimum sub-scanning coordinate has a minimum value in the each of the plurality of divided areas of the image data in the sub-scanning direction of the image data. The coordinate generator 42 further generates the read addresses (i.e., first read addresses) for reading the plurality of divided areas of the image data from the first main memory 10 or the second main memory 7 based on the detected minimum Y coordinate in the each of the plurality of divided areas. The DMAC 33a reads the plurality of divided areas of the image data from the first main memory 10 or the second main memory 7 based on the first read addresses, and detects the number of the lines of the image data read from the first main memory 10 or the second main memory 7. The processing line number comparator 41 outputs the read wait request for requesting the DMAC 33a to wait to be allowed to read the image data (i.e., read standby state), and cancels the read wait request (i.e., cancellation of the standby state) based on the write line number, the read line number, and the coordinate information. The SRAM controller 43 generates the write addresses for writing the plurality of divided areas of the image data to the internal memory 50 based on the coordinate information, and sequentially writes the plurality of divided areas of the image data read by the DMAC 33a to the internal memory 50 based on the write addresses. The SRAM controller 43 further generates the read addresses (i.e., second read addresses) for reading the plurality of divided areas of the image data from the internal memory 50 based on the coordinate information, and sequentially reads the plurality of divided areas of the image data from the internal memory 50 based on the second read addresses.

With a simple configuration, therefore, the image processing unit 60 corrects the inclination of the image data while controlling the number of lines of the image data written to the first main memory 10 or the second main memory 7 and the number of lines of the image data read from the first main memory 10 or the second main memory 7. Accordingly, the inclination correction is appropriately performed on the image data with the first main memory 10 or the second main memory 7 having a small capacity.

Further, in the multifunction peripheral 1 of the present embodiment, the image processing unit 60 further includes the DMAC 33b (i.e., the write-back circuit) that sequentially writes the plurality of divided areas of the image data read by the SRAM controller 43 back to the first main memory 10 or the second main memory 7.

With a simple configuration, therefore, the image processing unit 60 causes the image data read from the first main memory 10 or the second main memory 7 to be written back to the first main memory 10 or the second main memory 7 with the inclination of the image data relative to the output medium corrected. Accordingly, the usability of the image data is enhanced.

Further, in the image processing unit 60 of the multifunction peripheral 1 of the present embodiment, each time the inclination of the image data represented by the minimum Y coordinate exceeds a certain degree of inclination (for example, in the above-described case referring to FIG. 10) based on the number of the plurality of divided areas of the image data, the coordinate generator 42 serving as the read address generating circuit allocates addresses of divided areas successive in the sub-scanning direction in the plurality of divided areas of the image data as the first read addresses for reading the plurality of divided areas of the image data from the image memory. Further, the DMAC 33a serving as the data reading circuit reads the divided areas successive in the sub-scanning direction from the first main memory 10 or the second main memory 7 based on the first read addresses, and collectively detects the number of lines including the divided areas successive in the sub-scanning direction as the read line number.

With a simple configuration, therefore, the image processing unit 60 corrects the inclination of the image data while controlling the image data reading from the first main memory 10 or the second main memory 7 for each of the divided areas of the image data in accordance with the inclination of the image data, and controlling the number of lines of the image data written to the first main memory 10 or the second main memory 7 and the number of lines of the image data read from the first main memory 10 or the second main memory 7. With the first main memory 10 or the second main memory 7 having a small capacity, therefore, the image processing unit 60 appropriately performs the inclination correction on image data with various degrees of inclination.

Further, in the image processing unit 60 of the multifunction peripheral 1 of the present embodiment, the coordinate generator 42 serving as the read address generating circuit determines the direction of the inclination of the image data based on the minimum sub-scanning coordinate, determines the reading order of reading the plurality of divided areas of the image data in the main scanning direction in accordance with the direction of the inclination of the image data, and generates the first read addresses for reading the plurality of divided areas of the image data in accordance with the reading order.

With a simple configuration, therefore, the image processing unit 60 corrects the inclination of the image data by controlling the reading order of reading the plurality of divided areas of the image data from the first main memory 10 or the second main memory 7 in accordance with the direction of the inclination of the image data. Accordingly, the image processing unit 60 appropriately performs the inclination correction on the image data with the first main memory 10 or the second main memory 7 having a small capacity.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing device comprising:
   a data writing circuit configured to
      write image data to an image memory, and
      detect a write line number representing a quantity of lines of the image data written to the image memory;
   a coordinate generating circuit configured to
      generate coordinate information based on inclination information, the coordinate information including a coordinate in a main scanning direction and a coordinate in a sub-scanning direction that represent a position of each of pixels of the image data relative to an output medium onto which the image data is to be output, and the inclination information representing an inclination of the image data in the image memory relative to the output medium,
      detect, from the coordinate information, a minimum sub-scanning coordinate in each divided area of a plurality of divided areas of the image data divided by a particular division number in the main scanning direction, the minimum sub-scanning coordinate having a minimum value in each divided area of the plurality of divided areas of the image data in the sub-scanning direction of the image data, and
      generate first read addresses for reading the plurality of divided areas of the image data from the image memory based on the detected minimum sub-scanning coordinate in each divided area of the plurality of divided areas of the image data;
   a data reading circuit configured to
      read the plurality of divided areas of the image data from the image memory based on the first read addresses, and
      detect a read line number representing a quantity of lines of the plurality of divided areas of the image data that is read from the image memory;
   a reading control circuit configured to
      bring the data reading circuit into a standby state, such that the data reading circuit stops reading the plurality of divided areas of the image data from the image memory, and
      cancel the standby state based on the write line number, the read line number, and the coordinate information; and
   a memory control circuit configured to
      generate write addresses for writing the plurality of divided areas of the image data to a memory based on the coordinate information,
      sequentially write the plurality of divided areas of the image data read by the data reading circuit to the memory based on the write addresses,
      generate second read addresses for reading the plurality of divided areas of the image data from the memory based on the coordinate information, and sequentially read the plurality of divided areas of the image data from the memory based on the second read addresses.

2. The image processing device of claim 1, further comprising:
a write-back circuit configured to sequentially write the plurality of divided areas of the image data that is read by the memory control circuit back to the image memory.

3. The image processing device of claim 1, wherein
the coordinate generating circuit is configured to allocate addresses of divided areas successive in the sub-scanning direction in the plurality of divided areas of the image data as the first read addresses for reading the plurality of divided areas of the image data from the image memory, based on the inclination of the image data represented by the minimum sub-scanning coordinate exceeding a certain degree of inclination based on a quantity of the plurality of divided areas of the image data, and
the data reading circuit is configured to
reads the divided areas successively in the sub-scanning direction of the image data from the image memory based on the first read addresses, and
collectively detect a quantity of lines of the plurality of divided areas that are read successively in the sub-scanning direction of the image data as the read line number.

4. The image processing device of claim 1, wherein the coordinate generating circuit is configured to
determines a direction of the inclination of the image data based on the minimum sub-scanning coordinate,
determines a reading order of reading the plurality of divided areas of the image data in the main scanning direction of the image data in accordance with the direction of the inclination of the image data, and
generates the first read addresses for reading the plurality of divided areas of the image data in accordance with the reading order.

5. An image forming apparatus, comprising:
an image reading device configured to read a document to generate image data of the document;
the image processing device of claim 1, configured to perform image processing on the image data; and
an image output device configured to form and output an image on an output medium based on the image data subjected to the image processing.

6. An image processing method, comprising:
writing image data to an image memory;
detecting a write line number representing a quantity of lines of the image data written to the image memory;
generating coordinate information based on inclination information, the coordinate information including a coordinate in a main scanning direction and a coordinate in a sub-scanning direction that represent a position of each of pixels of the image data relative to an output medium onto which the image data is to be output, and the inclination information representing an inclination of the image data in the image memory relative to the output medium;
detecting, from the coordinate information, a minimum sub-scanning coordinate in each of a plurality of divided areas of the image data divided by a particular division number in the main scanning direction, the minimum sub-scanning coordinate having a minimum value in each divided area of the plurality of divided areas of the image data in the sub-scanning direction of the image data;
generating first read addresses associated with reading the plurality of divided areas of the image data from the image memory based on the detected minimum sub-scanning coordinate in each divided area of the plurality of divided areas of the image data;
reading the plurality of divided areas of the image data from the image memory based on the first read addresses;
detecting a read line number representing a quantity of lines of the image data read from the image memory;
stopping and starting the reading the plurality of divided areas of the image data based on the write line number, the read line number, and the coordinate information;
generating write addresses associated with writing the plurality of divided areas of the image data to a memory based on the coordinate information;
sequentially writing, to the memory, the plurality of divided areas of the image data read in the reading the plurality of divided areas of the image data based on the write addresses;
generating second read addresses associated with reading the plurality of divided areas of the image data from the memory based on the coordinate information; and
sequentially reading the plurality of divided areas of the image data from the memory based on the second read addresses.

7. The image processing method of claim 6, further comprising:
sequentially writing back, to the image memory, the plurality of divided areas of the image data read in the sequentially reading the plurality of divided areas of the image data.

8. The image processing method of claim 6, further comprising:
allocating addresses of divided areas successive in the sub-scanning direction in the plurality of divided areas of the image data as the first read addresses for reading the plurality of divided areas of the image data from the image memory, based on the inclination of the image data represented by the minimum sub-scanning coordinate exceeding a certain degree of inclination based on a quantity of the plurality of divided areas of the image data;
reading the divided areas successive in the sub-scanning direction of the image data from the image memory based on the first read addresses; and
collectively detecting a number of lines including the divided areas successive in the sub-scanning direction as the read line number.

9. The image processing method of claim 6, further comprising:
determining a direction of the inclination of the image data based on the minimum sub-scanning coordinate;
determining a reading order of reading the plurality of divided areas of the image data in the main scanning direction of the image data in accordance with the direction of the inclination of the image data; and
generating the first read addresses associated with reading the plurality of divided areas of the image data in accordance with the reading order.

10. A non-transitory recording medium storing a program that, when executed by a computer, causes the computer to execute an image processing method, the image processing method comprising:

writing image data to an image memory;

detecting a write line number representing a quantity of lines of the image data written to the image memory;

generating coordinate information based on inclination information, the coordinate information including a coordinate in a main scanning direction and a coordinate in a sub-scanning direction that represent a position of each of pixels of the image data relative to an output medium onto which the image data is to be output, and the inclination information representing an inclination of the image data in the image memory relative to the output medium;

detecting, from the coordinate information, a minimum sub-scanning coordinate in each of a plurality of divided areas of the image data divided by a particular division number in the main scanning direction, the minimum sub-scanning coordinate having a minimum value in each divided area of the plurality of divided areas of the image data in the sub-scanning direction of the image data;

generating first read addresses for reading the plurality of divided areas of the image data from the image memory based on the detected minimum sub-scanning coordinate in each divided area of the plurality of divided areas of the image data;

reading the plurality of divided areas of the image data from the image memory based on the first read addresses;

detecting a read line number representing a quantity of lines of the image data read from the image memory;

stopping and starting the reading the plurality of divided areas of the image data based on the write line number, the read line number, and the coordinate information;

generating write addresses for writing the plurality of divided areas of the image data to a memory based on the coordinate information;

sequentially writing to the memory the plurality of divided areas of the image data read in the reading the plurality of divided areas of the image data based on the write addresses;

generating second read addresses for reading the plurality of divided areas of the image data from the memory based on the coordinate information; and sequentially reading the plurality of divided areas of the image data from the memory based on the second read addresses.

11. The non-transitory recording medium of claim 10, wherein the image processing method further comprises:

sequentially writing back to the image memory the plurality of divided areas of the image data read in the sequentially reading the plurality of divided areas of the image data.

12. The non-transitory recording medium of claim 10, wherein the image processing method further comprises:

allocating addresses of divided areas successive in the sub-scanning direction in the plurality of divided areas of the image data as the first read addresses for reading the plurality of divided areas of the image data from the image memory, based on the inclination of the image data represented by the minimum sub-scanning coordinate exceeding a certain degree of inclination based on a quantity of the plurality of divided areas of the image data;

reading the divided areas successive in the sub-scanning direction of the image data from the image memory based on the first read addresses; and collectively detecting a quantity of lines including the divided areas successive in the sub-scanning direction as the read line number.

13. The non-transitory recording medium of claim 10, wherein the image processing method further comprises:

determining a direction of the inclination of the image data based on the minimum sub-scanning coordinate;

determining a reading order of reading the plurality of divided areas of the image data in the main scanning direction of the image data in accordance with the direction of the inclination of the image data; and generating the first read addresses for reading the plurality of divided areas of the image data in accordance with the reading order.

* * * * *